United States Patent Office 2,874,065
Patented Feb. 17, 1959

2,874,065

PROTECTION OF FERROUS METAL PARTS AGAINST LIQUID MOLTEN ALUMINUM

William Herz and Egon Pipitz, Yonkers, N. Y., assignors to Schwarzkopf Development Corporation, Yonkers, N. Y., a corporation of Maryland No Drawing. Application April 19, 1956
Serial No. 579,161

3 Claims. (Cl. 117—46)

In the past, insurmountable difficulties have been encountered in the use of ferrous metals such as steel or other alloys containing at least 50% Fe as vessels or as the exterior housings for parts which have to be exposed to contact with liquid molten aluminum for prolonged periods of time. Ferrous thermocouple protection tubes used for measuring the temperature of molten aluminum had to be coated daily with an aluminum oxide coating which had to be renewed each day in order to prevent destruction of the thermocouple housing. In applications where molten aluminum was used for forming aluminum-coated parts, the ferrous vessels used for holding the molten aluminum had to be lined with bricks of silicon carbide or similar type bricks.

Among the objects of the invention is to provide a process for protecting the surface region of a ferrous metal body such as the surface region of a ferrous metal vessel against reaction with liquid aluminum.

Among other objects of the invention is to provide a ferrous metal body which has at least one surface region which is coated with a composition which protects said region against reaction with liquid aluminum.

In addition to having a good resistance against molten aluminum the coated products of the invention have very good resistance to oxidation.

The present invention is based on the discovery that ferrous metal will be protected for long periods of time against corrosion when exposed to molten aluminum at temperatures from 660° C. to about 1000° C. (molten aluminum being normally maintained at about 800° C.) by flame spraying said region with a chromium nickel boron compound employing a flame spray gun operating with a flame in excess of 3000° C. Care is taken in the process to assure that the coating composition contains no free nickel, $Ni_2B$ and/or $NiB$.

Good results are obtained with a sintered rod consisting of $CrB_2$ with 7% to 50% $Cr_2NiB_4$. A sintered rod containing $CrB_2$ plus 7% $Cr_2NiB_4$ and containing no free nickel, $Ni_2B$ and/or $NiB$ is made as follows:

Electrolytic chromium powder and boron powder are mixed together thoroughly, compacted into small chunks, and heated in a graphite crucible under an atmosphere of hydrogen between 1600° C. and 2000° C., for approximately one hour, and sufficient to bring about the reaction in which the chromium and boron combine into $CrB_2$. The reaction product is a crumbly mass which is comminuted by ball-milling or the like comminuting process into fine powder of not larger than —100 mesh particle size. For best results, a powder of —325 mesh particle size is desirable. To produce a sintered rod consisting of $CrB_2$ containing 7% of the ternary compound $Cr_2NiB_4$, the following procedure may be used:

$CrB_2$ powder is mixed with 2% carbonyl nickel and 2% of a resinous binder. A water soluble type of resinous binder such as the methyl cellulose sold under the trade name of "Methocel" by Dow Chemical Company is very satisfactory. (Other water soluble resinous binders include carboxymethyl cellulose, polyvinyl alcohols, sodium salts of modified styrene resins such as sold under the trade names of Lustrex 710 and 770 by Monsanto Chemical Co., etc.) The mixture is ball-milled for one hour and mixed with water to a dough-like consistency. This dough is extruded through a suitable die into a rod such as a 14" length rod. The rods are dried at room temperature for 24 hours, whereupon they are self-supporting and suitable for handling. The rods are then placed on graphite supports within a furnace and sintered at 1500° C. to 1700° C. in a pure hydrogen atmosphere for about ¾ hour. After sintering, the rods are of sufficient strength to be fed into commercially available metal flame spray guns for melting in the gun and depositing on the surface to be protected with the desired coating. Good results are obtained with rods having a diameter of about ⅛".

We have found that for providing a ferrous body with the best type of corrosion-resisting coating of the invention, it is desirable to coat them with a coating consisting of $CrB_2$ containing 35% to 50% $Cr_2NiB_4$, because a coating of this composition has a thermal expansion coefficient approaching relatively closely the thermal coefficient of expansion of ferrous metal used for holding liquid aluminum, or for housings that are immersed in liquid aluminum.

There will now be described an example of a process for producing sintered rods of $CrB_2$ containing 35% $Cr_2NiB_4$. Chromium powder, boron powder and carbonyl nickel are mixed in proportions corresponding to 72% $CrB_2$ plus 28% $Cr_2NiB_4$. They are mixed together and compacted into small chunks, and heated in a graphite crucible under hydrogen at 1600° C. The time of reaction is practically kept in the neighborhood of one hour. The resulting rather hard mass is crushed and ball-milled. In general the powders used for rods should be —325 mesh particle size or smaller. The resulting powder consists of $CrB_2$ plus 28% $Cr_2NiB_4$. To this powder 2% carbonyl nickel is added and the composition is ball-milled for 24 hours, then 2% plastic is added and the composition is ball-milled for another hour. Thereafter, the composition is treated to form sintered rods as described in Example 1. The additional nickel added in the sintering process raises the content of $Cr_2NiB_4$ in the rod to about 35%.

In spray coating, the rod is fed through a flame spray gun capable of operating with a flame in excess of 3000° C., at a speed of about 2 up to 7 inches per minute. Very good results are obtained with feeding the rod at 4½" per minute. As the rod is fed through the gun, it is molten as it passes through the flame, and the molten metal is discharged by the air stream of the gun against the surface of the ferrous body, which has previously been cleaned and roughened. Very good results are obtained when using oxygen-acetylene flame of the type used with standard commercial guns. Depending on the speed of movement of the gun relatively to the surface, very good results are obtained with ferrous metal having a coating of $CrB_2$ plus $Cr_2NiB_4$ from 7% to 50%, having a thickness of 20 to 30 mils. The spray gun is passed several times over the ferrous surface to be coated to produce this thickness. Care must be taken that the sprayed ferrous body should not be overheated. Its temperature should not exceed 200° C. The surface of the ferrous body may be cleaned and roughened by blasting with a blast of coarse steel grit. Good results are obtained with grit of —8 mesh particle size. Depending on the care of spraying, the useful life of the coated ferrous body containing $CrB_2$ and 35% $Cr_2NiB_4$, of a thickness of about 20 mils, when exposed to molten aluminum, is between 600 hours and 1100 hours at 800° C.

Where the dimension of the coated body is significant, the exterior of the coating may be ground to the desired dimension, for instance in the case of a pump shaft or pump housing used for pumping molten aluminum.

In practice very good results are obtained by feeding a sintered rod of $CrB_2$ powder of the type described above to the flame of commercially widely used spray guns, such as guns manufactured by the Metallizing Company of America and sold under the trademark "Mogul," at a rate of 2 to 7 inches per minute, or in general about 4½ inches per minute, the gun operating with a flame of acetylene and oxygen, some of the features of such gun being described in Patent No. 2,556,193.

In addition to having excellent resistances against the corrosive action of molten aluminum the coating of the invention provides good protection against oxidation.

The features and principles underlying the invention described above in connection with specific exemplifications will suggest to those skilled in the art many other modifications thereof. It is accordingly desired that the appended claims shall not be limited to any specific feature or details thereof.

We claim:

1. In a process for protecting the surface region of a strong, solid, ferrous metal body such as the surface region of a ferrous metal vessel, against reaction with liquid aluminum, the procedure comprising spraying with a flame-spray gun having a flame in excess of 3000° C. the contents of a sintered spray rod which is bare of free nickel and organic matter and consists of 7% to 50% $Cr_2NiB_4$ and 93% to 50% of $CrB_2$ against the surface region of the ferrous body which has been previously cleaned and roughened, and thereby providing the surface of said ferrous body with an adherent continuous coating layer consisting of the contents of the sprayed rod.

2. The process as claimed in claim 1 wherein said coating is applied in a thickness of at least about 20–30 mils.

3. As an article of manufacture a ferrous metal body having at least one region thereof which is covered with a continuous adherent coating which makes said region resistant to the action of molten aluminum, said coating having a thickness of at least .020 of an inch and consisting of chromium diboride containing 7 to 50% of $Cr_2NiB_4$, said coating being bare of free nickel, $Ni_2B$ and NiB and of organic matter.

References Cited in the file of this patent

UNITED STATES PATENTS

| | | |
|---|---|---|
| 2,189,387 | Wissler | Feb. 6, 1940 |
| 2,570,649 | Davidoff | Oct. 9, 1951 |
| 2,776,468 | Steinitz | Jan. 8, 1957 |